United States Patent
Hwang et al.

(10) Patent No.: US 9,971,673 B2
(45) Date of Patent: *May 15, 2018

(54) SYSTEM AND METHOD FOR TESTING SOFTWARE IN A MULTI-PLATFORM TESTING ENVIRONMENT

(71) Applicant: International Business Machines Corporation, Armonk, NY (US)

(72) Inventors: Hubert Hwang, Mountain View, CA (US); Rosalba Lucero, Westminster, CO (US); Hassan A. Shazly, Columbia, SC (US); Douglas A. Van Dyken, Anderson, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/339,767

(22) Filed: Jul. 24, 2014

(65) Prior Publication Data

US 2016/0026562 A1 Jan. 28, 2016

(51) Int. Cl.
*G06F 9/44* (2018.01)
*G06F 11/36* (2006.01)

(52) U.S. Cl.
CPC ...... *G06F 11/3664* (2013.01); *G06F 11/3688* (2013.01); *G06F 11/3692* (2013.01)

(58) Field of Classification Search
USPC .......................................................... 717/124
See application file for complete search history.

(56) References Cited

U.S. PATENT DOCUMENTS

| | | | |
|---|---|---|---|
| 5,548,718 A | 8/1996 | Siegel et al. | |
| 5,671,351 A | 9/1997 | Wild et al. | |
| 6,301,701 B1 | 10/2001 | Walker et al. | |
| 6,557,120 B1 | 4/2003 | Nicholson et al. | |
| 6,662,217 B1 | 12/2003 | Godfrey et al. | |
| 6,715,108 B1 * | 3/2004 | Badger ................. | G06F 11/263 707/999.202 |
| 7,299,451 B2 | 11/2007 | Dygon et al. | |
| 8,037,453 B1 | 10/2011 | Zawadzki | |
| 8,091,066 B2 | 1/2012 | Fiore | |
| 8,572,437 B2 | 10/2013 | Chang et al. | |
| 2004/0186686 A1 * | 9/2004 | Hsia ........................ | G07C 3/14 702/185 |

(Continued)

FOREIGN PATENT DOCUMENTS

CN 103207828 A 7/2013

OTHER PUBLICATIONS

IBM List of Patents or Patent Applications to be Treated as Related dated May 29, 2015, pp. 1-2.

*Primary Examiner* — Hang Pan
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and system is provided for testing software. In an implementation, a method may include executing at least one test group during testing of a software application in a multi-platform testing environment. The method may also include detecting an error in the software application based upon, at least in part, execution of the at least one test group. The method may further include resolving the error during execution of the at least one test group in the multi-platform testing environment.

9 Claims, 8 Drawing Sheets

(56) References Cited

U.S. PATENT DOCUMENTS

| | | | |
|---|---|---|---|
| 2007/0226691 A1* | 9/2007 | Happell et al. ............... | 717/124 |
| 2008/0010542 A1* | 1/2008 | Yamamoto .......... | G06F 11/3672 |
| | | | 714/38.1 |
| 2009/0235172 A1* | 9/2009 | Gandhi ............... | G06F 11/3688 |
| | | | 715/733 |
| 2012/0159247 A1* | 6/2012 | Johnson .............. | G06F 11/3696 |
| | | | 714/25 |
| 2012/0204153 A1* | 8/2012 | Peterson et al. ............. | 717/124 |
| 2013/0041613 A1* | 2/2013 | Bhide ................. | G06F 11/3688 |
| | | | 702/123 |
| 2013/0047140 A1* | 2/2013 | Shann ................ | G06F 11/3664 |
| | | | 717/128 |
| 2013/0139127 A1 | 5/2013 | Vecera et al. | |
| 2013/0159774 A1* | 6/2013 | Budnik .............. | G06F 11/3688 |
| | | | 714/33 |

\* cited by examiner

| testGroup Priority | | testGroup Status | | testCase Status | |
| --- | --- | --- | --- | --- | --- |
| H | High | X | Not run | X | Not run |
| M | Medium | I | In progress | I | In progress |
| L | Low | P | Passes | P | passes |
| | | F | Failed | F | Failed |
| | | R | Re-run | R | Re-run |

FIG. 6

| testGroup Priority | testGroup Status | testCase status |
|---|---|---|
| H | R | R |
| H | R | X |
| H | X | X |
| M | X | X |
| L | X | X |

FIG. 7

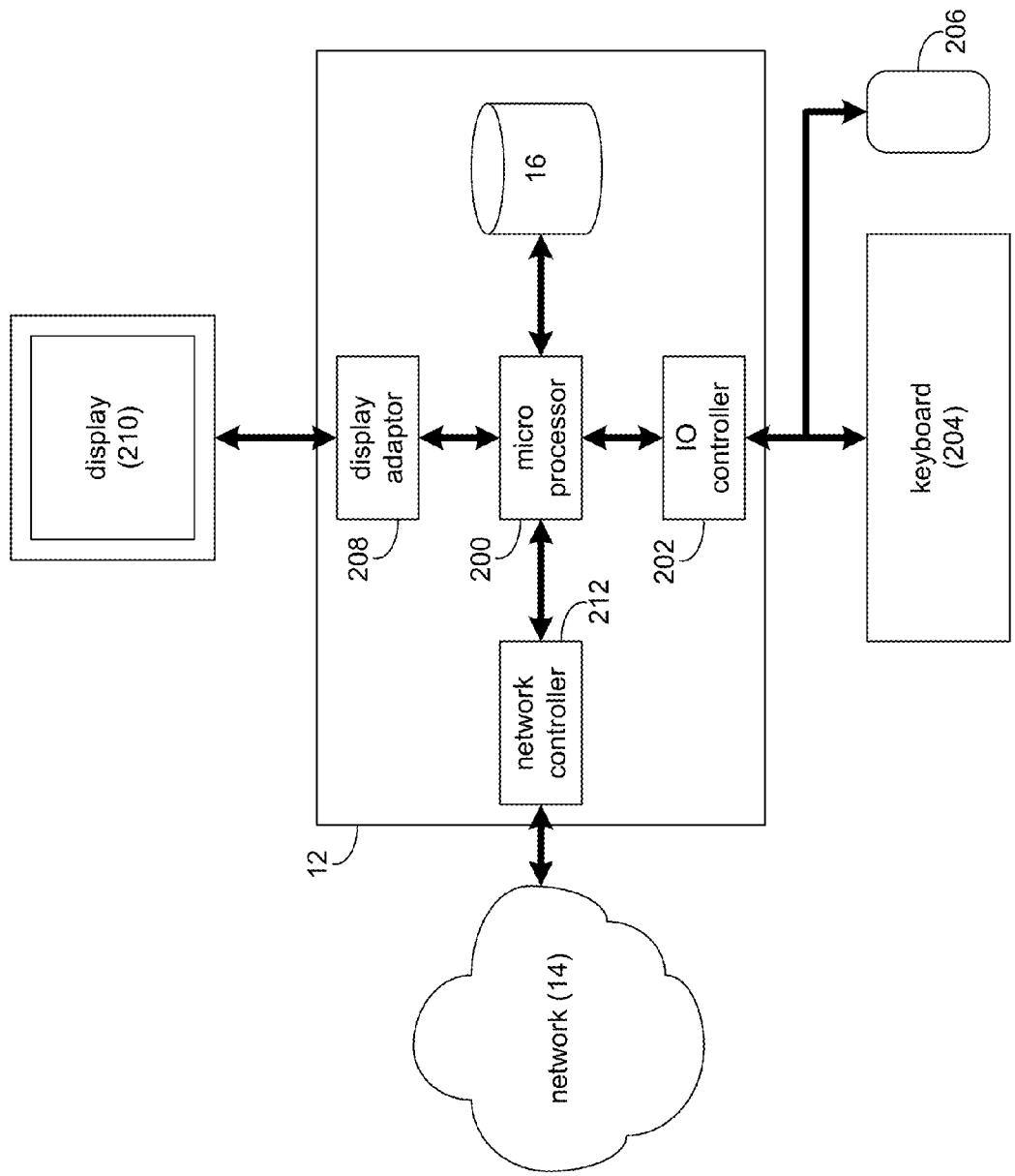

SYSTEM AND METHOD FOR TESTING SOFTWARE IN A MULTI-PLATFORM TESTING ENVIRONMENT

TECHNICAL FIELD

The present disclosure generally relates to testing software, and more particularly relates to system and methods for continuously testing software during a development cycle across multiple platforms.

BACKGROUND

Testing software during a development cycle may be challenging. The larger the software package, the more individual source and/or executable modules to be tested, the more challenging the problem may become. Thousands of tests may be run. The elapsed time to run a full test suite may extend to days, weeks, or months. This elapsed time may affect the development time and the delivery time.

SUMMARY OF DISCLOSURE

According to an implementation, a computer-implemented method may include executing at least one test group during testing of a software application in a multi-platform testing environment. The method may also include detecting an error in the software application based upon, at least in part, execution of the at least one test group. The method may further include resolving the error during execution of the at least one test group in the multi-platform testing environment.

One or more of the following features may be included. Executing the at least one test group during testing of the software application in the multi-platform testing environment may include concurrently executing the at least one test group during testing of the software application across a plurality of operating systems.

The method may further include testing incremental code during testing of the software application. The at least one test group may be executed based upon, at least in part, a priority level.

The at least one test group may include at least one test case. The method may further include executing the at least one test case during testing of the software application in the multi-platform testing environment. The at least one test case may be executed based upon, at least in part, a processing order.

According to another implementation, a computer program product includes a computer readable medium having a plurality of instructions stored on it. When executed by a processor, the instructions may cause the processor to perform operations including executing at least one test group during testing of a software application in a multi-platform testing environment. Instructions may also be included for detecting an error in the software application based upon, at least in part, execution of the at least one test group. Instructions may also be included for resolving the error during execution of the at least one test group in the multi-platform testing environment.

One or more of the following features may be included. Instructions for executing the at least one test group during testing of the software application in the multi-platform testing environment may include concurrently executing the at least one test group during testing of the software application across a plurality of operating systems.

Instructions may be included for testing incremental code during testing of the software application.

The at least one test group may be executed based upon, at least in part, a priority level.

The at least one test group may include at least one test case. Instructions may be included for executing the at least one test case during testing of the software application in the multi-platform testing environment. The at least one test case may be executed based upon, at least in part, a processing order.

According to another implementation, a system may include at least one processor device and at least one memory architecture coupled with the at least one processor device. The at least one processor device may be configured for executing at least one test group during testing of a software application in a multi-platform testing environment. The at least one processor may also be configured for detecting an error in the software application based upon, at least in part, execution of the at least one test group. The at least one processor may further be configured for resolving the error during execution of the at least one test group in the multi-platform testing environment.

One or more of the following features may be included. Executing the at least one test group during testing of the software application in the multi-platform testing environment may include concurrently executing the at least one test group during testing of the software application across a plurality of operating systems.

The at least one processor may further be configured for testing incremental code during testing of the software application. The at least one test group may be executed based upon, at least in part, a priority level.

The at least one test group may include at least one test case. The at least one processor may further be configured for executing the at least one test case during testing of the software application in the multi-platform testing environment. The at least one test case may be executed based upon, at least in part, a processing order.

The details of one or more implementations are set forth in the accompanying drawings and the description below. Other features and advantages will become apparent from the description, the drawings, and the claims.

BRIEF DESCRIPTION OF THE DRAWINGS

FIG. 6 diagrammatically depicts a summary of priority and status values of the test process of FIG. 1;

FIG. 7 diagrammatically depicts a test selection order of the test process of FIG. 1;

FIG. 8 is a diagrammatic view of the computing device of FIG. 1, according to an implementation of the present disclosure.

Like reference symbols in the various drawings indicate like elements.

DETAILED DESCRIPTION

Figure 1:
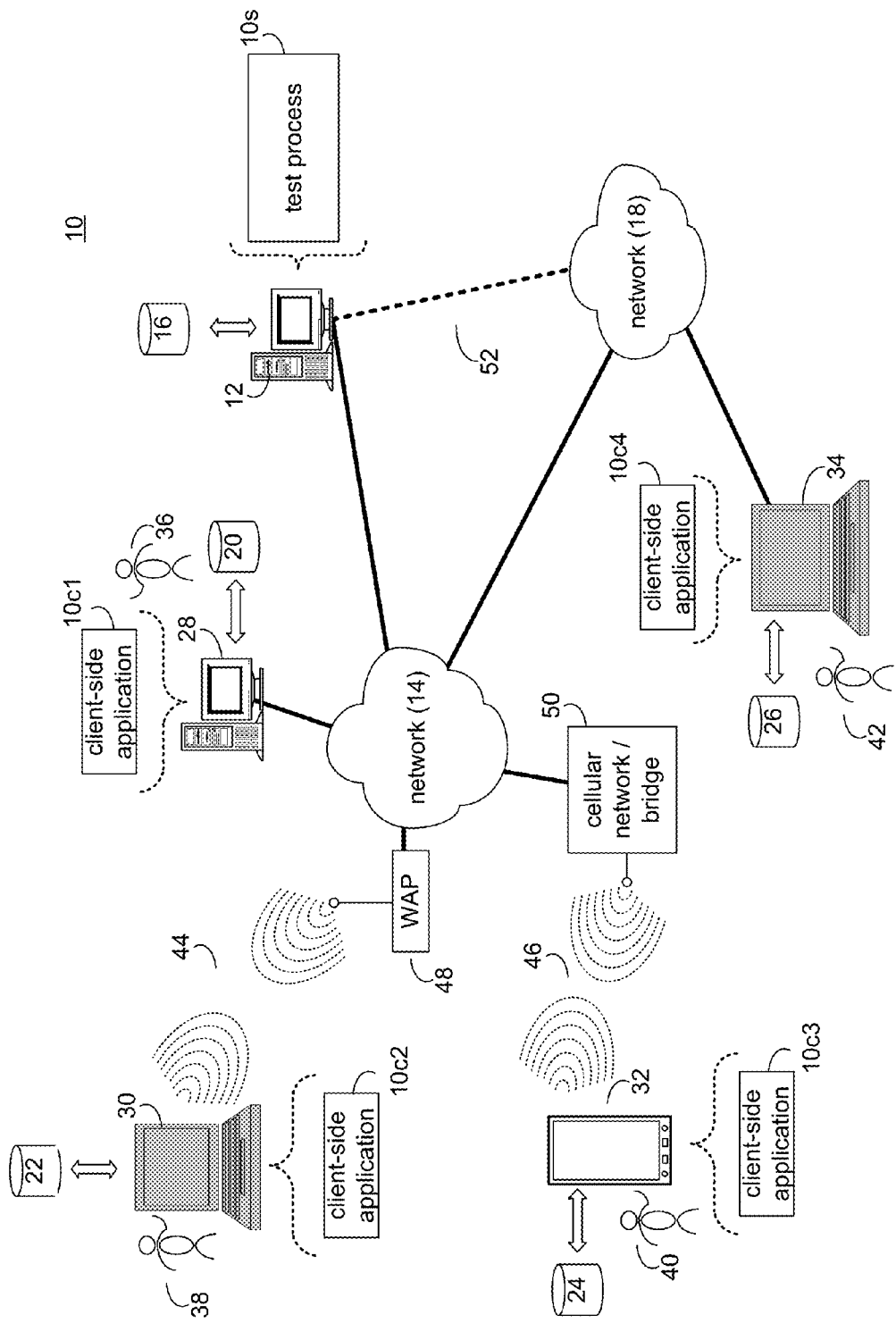
FIG. 1 is a diagrammatic view of a distributed computing network including a computing device that executes a test process according to an implementation of the present disclosure.

Referring to FIG. 1, there is shown test process 10. For the following discussion, it is intended to be understood that test process 10 may be implemented in a variety of ways. For example, test process 10 may be implemented as a server-side process, a client-side process, or a server-side/client-side process.

For example, test process 10 may be implemented as a purely server-side process via test process 10s. Alternatively, test process 10 may be implemented as a purely client-side process via one or more of client-side application 10c1, client-side application 10c2, client-side application 10c3, and client-side application 10c4. Alternatively still, test process 10 may be implemented as a server-side/client-side process via screen test process 10s in combination with one or more of client-side application 10c1, client-side application 10c2, client-side application 10c3, and client-side application 10c4. In such an example, at least a portion of the functionality of test process 10 may be performed by test process 10s and at least a portion of the functionality of test process 10 may be performed by one or more of client-side application 10c1, 10c2, 10c3, and 10c3.

Accordingly, test process 10 as used in this disclosure may include any combination of test process 10s, client-side application 10c1, client-side application 10c2, client-side application 10c3, and client-side application 10c4.

Figure 2:
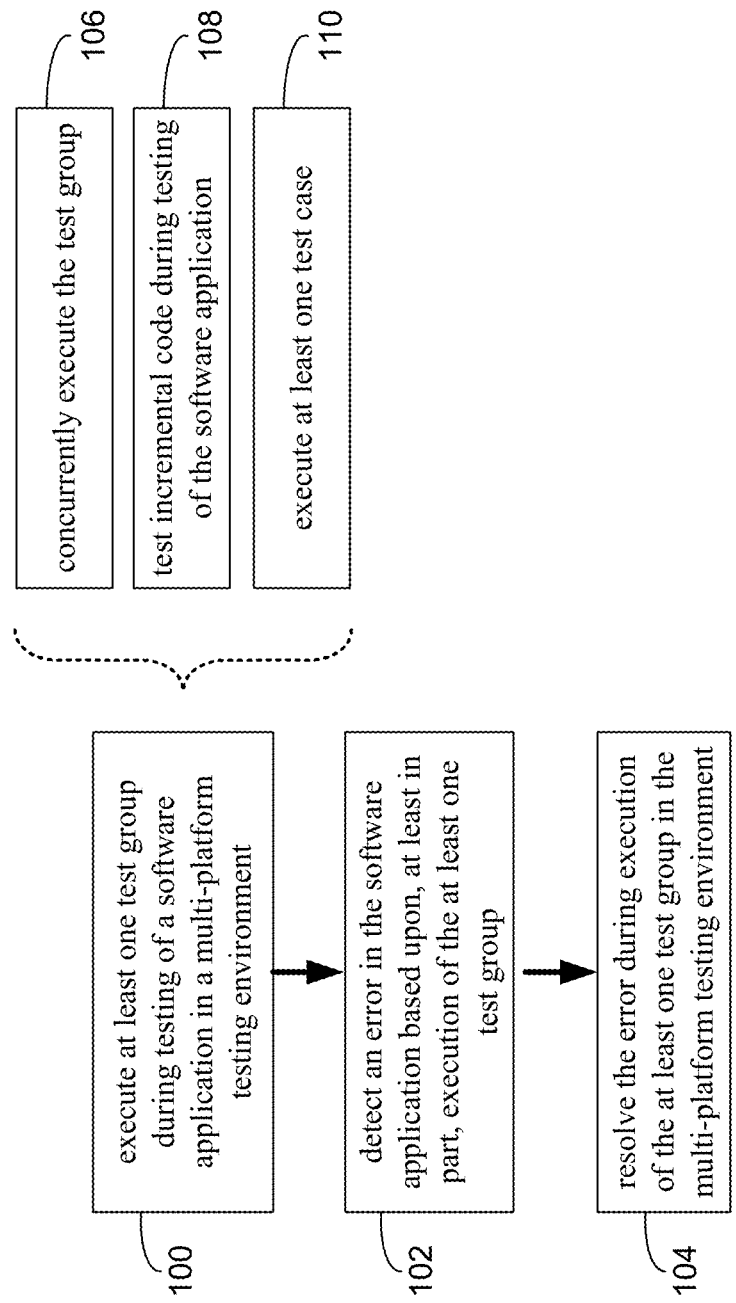
FIG. 2 is a flowchart of the test process of FIG. 1, according to an implementation of the present disclosure.

Referring also to FIG. 2, and as will be discussed in greater detail below, test process 10 may execute 100 at least one test group during testing of a software application in a multi-platform testing environment. Test process 10 may also detect 102 an error in the software application based upon, at least in part, execution of the at least one test group. Test process 10 may also resolve 104 the error during execution of the at least one test group in the multi-platform testing environment.

Test process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of test process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access test process 10 directly through network 14 or through secondary network 18. Further, test process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

As generally discussed above with reference to FIG. 2, test process 10 may execute 100 at least one test group during testing of a software application in a multi-platform testing environment. Test process 10 may also detect 102 an error in the software application based upon, at least in part, execution of the at least one test group. Test process 10 may also resolve 104 the error during execution of the at least one test group in the multi-platform testing environment.

Figure 3:
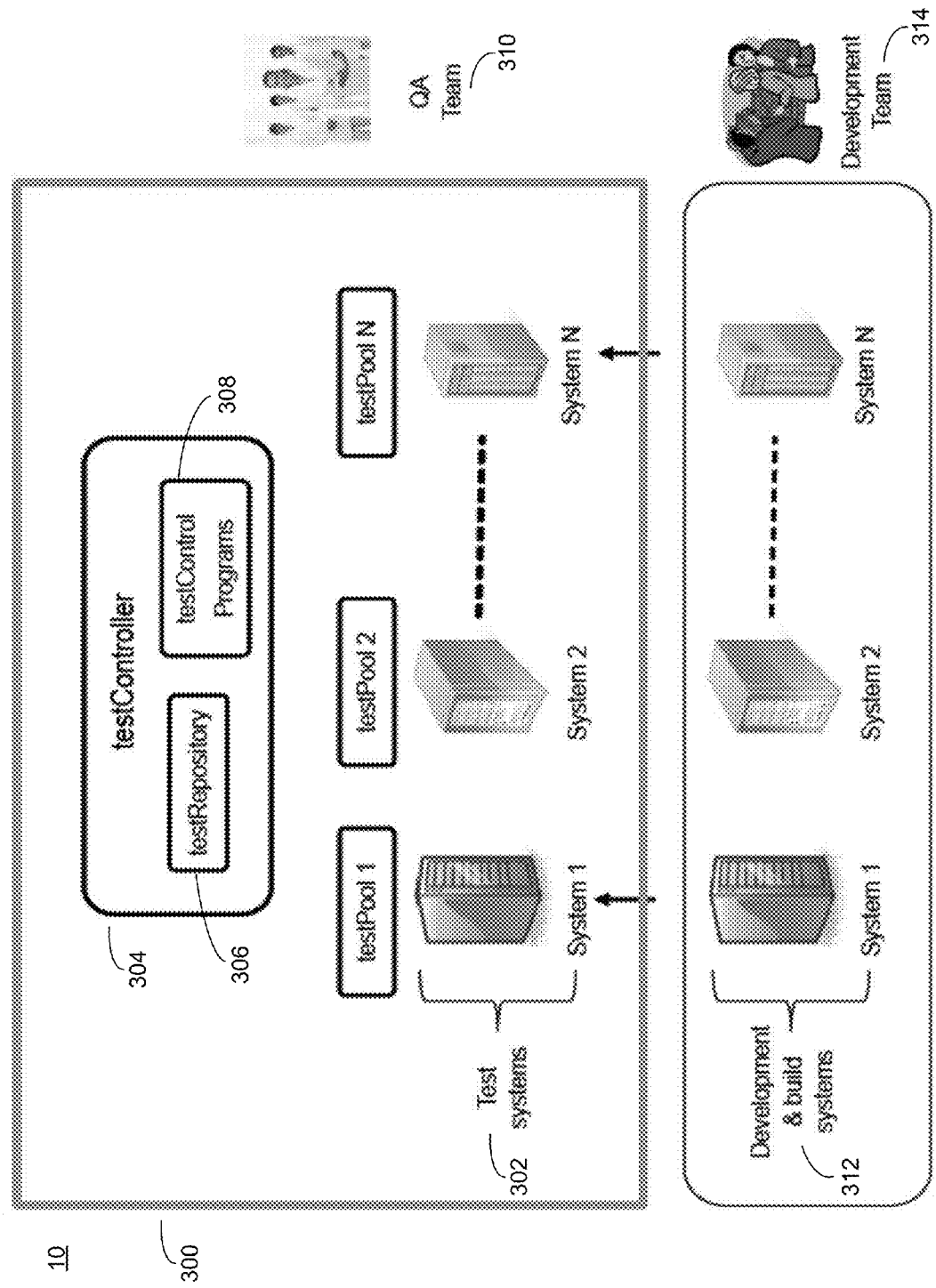
FIG. 3 diagrammatically depicts an implementation of the test process of FIG. 1, according to an example embodiment.

Test process 10 may allow for execution of multiple tests across multiple platforms in a controlled and targeted manner. An embodiment of test process 10 in the form of a testPlex environment is shown in FIG. 3. The testPlex (testPlex 300) may include one or more test systems 302 that may be running on the same or different operating systems and platforms. In some implementations, the number of test systems 302 may be equal to, or even greater than, the number of operating systems and platforms that the software application is targeted for. According to such an embodiment, it may be possible to separately execute tests against a software application for each of the operating systems and/or platforms that the software application is targeted for, using the several test systems 302. Automated test selection, execution and monitoring may be controlled by a test control system (testController 304), that may include a test repository (testRepository 306) and a set of control programs (testControl Programs 308). The test repository (testRepository 306) may include tests to be executed and their related data and metadata.

In an embodiment, testPlex 300 may be controlled by a QA team 310 while a development and build systems 312 (e.g., which may be used for development work and coding of the software application) may be controlled by a development team 314. In another embodiment, control of both testPlex 300 and development and build systems 312 may be more tightly integrated. In either case, a set of interfaces may be built that link testPlex 300 and development and build systems 312 such that new code and test results may be automatically shared between testPlex 300 and development and build systems 312.

Figure 4:
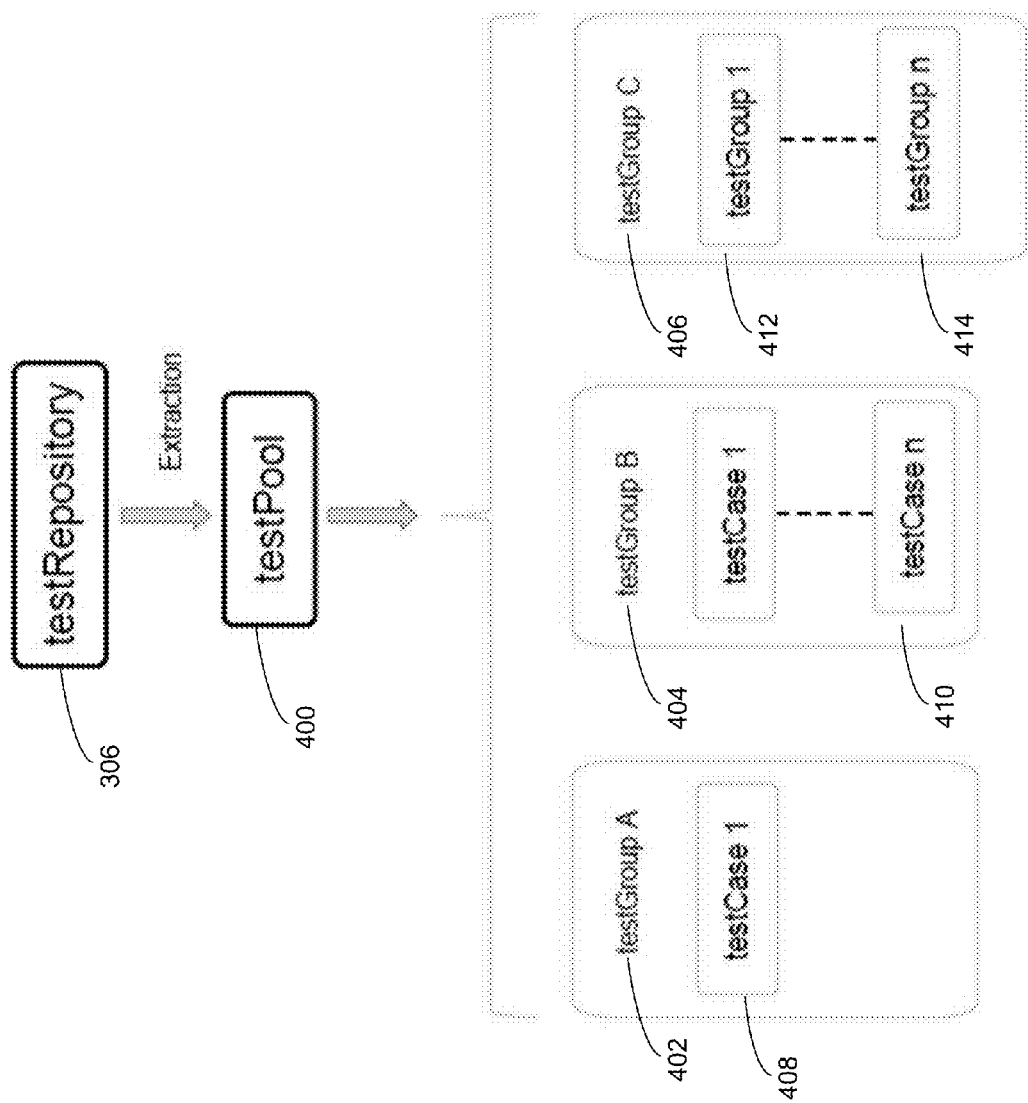
FIG. 4 diagrammatically depicts an implementation of the test process of FIG. 1, according to an example embodiment.

An embodiment of the hierarchical structure of test repository (testRepository 306) is shown in FIG. 4. The test repository 306 (testRepository 306) may include a data store to store test cases for the software application being tested, including but not limited to test scripts and test data. The test repository 306 (testRepository 306) may include all, or a portion of, developed test cases for all, or a portion of, platforms and operating systems, code levels, and releases of the software application. Test process 10 may extract a test pool (testPool 400) from testRepository 306. Test process 10 may further define a test pool as a subset of test cases within testRepository 306. Defining the test pool may include defining a collection of test cases that may be executed on a given operating system or platform at any given time. The test pool (testPool 400), which may include the collection of test cases, may be tailored to test a specific function, fix pack, or software release of the software application. Test process 10 may create and customize the test pool (testPool 400) on each test system 302 in the testPlex 300. The test pool (testPool 400) may include at least one test group (testGroup A 402, testGroup B 404, and testGroup C 406). In an embodiment, at least one test group (testGroup A 402, testGroup B 404) may include at least one test case (testCase 1 408, testCase n 410). A test group (testGroup C 406) may also include at least one test group (testGroup 1 412, testGroup n 414), each of which may include one or more test cases (not shown).

A test case (testCase 1 408, testCase 410) may be an automated test that may be executed. The test case (testCase 1 408, testCase n 410) may include a test script, test metadata, and references to test data that may be required to execute the test case. The test cases that are assigned to a test group (testGroup A 402, testGroup B 404) may be grouped based on any criteria, including but not limited to functional component to be tested, an identity of the developer, and/or developer preferences.

Figure 5:
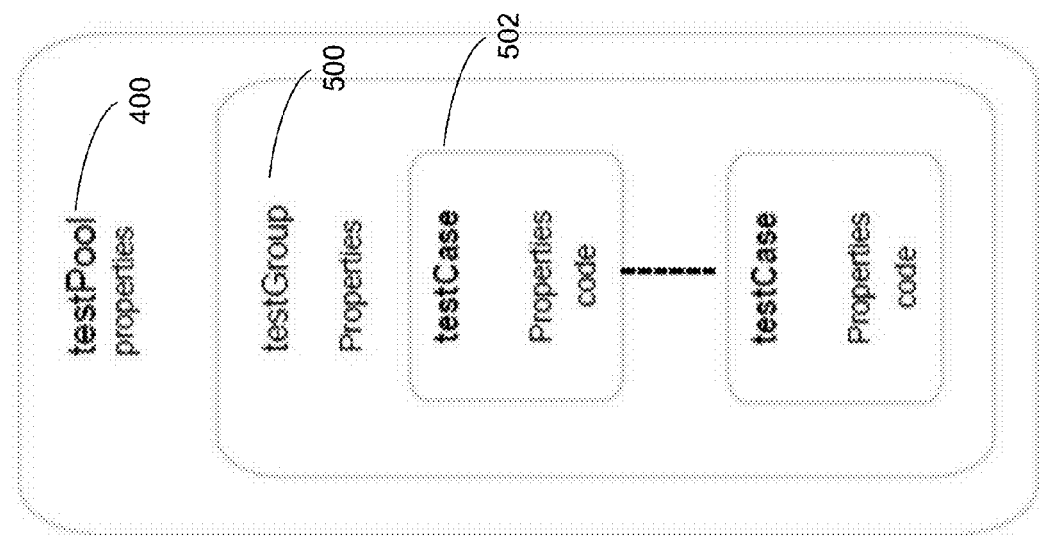
FIG. 5 diagrammatically depicts a hierarchical view of the test process of FIG. 1, according to an example embodiment.
Figure 5:
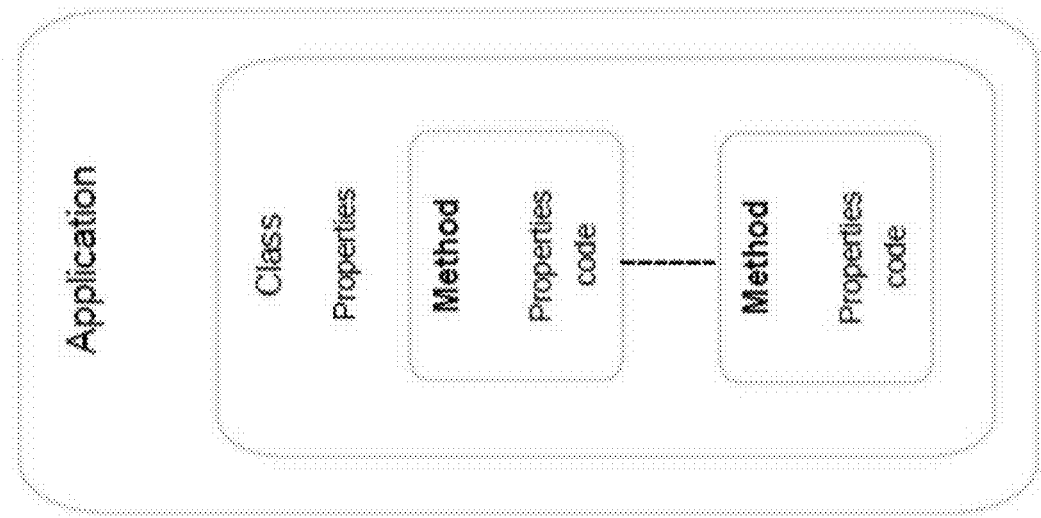

An object oriented view of test pools, test groups, and test cases is shown in FIG. 5. As shown in FIG. 5, a test case (testCase 502) may be similar to a method and may include a plurality of properties that are unique to each test case. The plurality of properties of each test case may include, but are not limited to:

1. Test case status. The status of a test case may include, but are limited to:

X [notRun]: the test case has not been run. At startup, each test case may be assigned this status.

I [inProgress]: the test case is currently being executed.

P [Passed]: the test case has been run successfully.

F [Failed]: the test case failed during execution. A failed test case may not be eligible to be re-run until the issue has been resolved.

R [Rerun]: the test case previously failed, the failure issue has been resolved, and the test case must be rerun to verify the resolution. Test cases in the "R" (rerun) state may have the highest priority, discussed below, and therefore may be executed before test cases in the "X" (not run) state.

2. Test case fail count. The number of times a particular test case has failed.

3. Test case average run time. The average run time of a particular test case within the test pool.

A test group (e.g., testGroup 500) may be similar to a class and may be selected for execution by the test pool. Once at least one test group is selected, execution of the at least one test case included within the test group may be controlled by test group properties. Test group properties may include, but are not limited to:

1. Test group status. The status of a test group may include, but are limited to:

X [notRun]: each test case included within the test group has not been run. At startup, all test groups may be assigned this status.

I [inProgress]: the test group is currently selected and each test case within this test group is being executed.

P [Passed]: the test group is set to this status after all of its associated test cases have been executed and have passed.

F [Failed]: one or more test cases within the test group have failed.

R [Rerun]: the test group previously failed, the failure issue has been resolved and the test group may be re-selected such that the test cases may be run in order to verify the resolution. Test groups in the "R" (rerun) state may be selected before test groups in the "X" (not run) state.

2. Test group priority. Test process 10 may associate and assign a test group priority to each test group. Test group priorities may include but are not limited to:

H [High]: for new code being tested, test process 10 may assign a priority of "H" (high) to a test group to ensure that new code may be tested first to ensure that the new code does not contain errors. The rest of the code may then be tested to ensure that no errors were introduced as a result of the new code. If a test group previously had a status of "F" (failed) and the issue is resolved, it may be re-inserted into the test pool and set to a priority of "H" (high) and a status of "R" (rerun).

M [Medium]: at startup, test process 10 may assign a priority of "M" (medium) to all test groups that may be run.

L [Low]: test process 10 may assign a priority of "L" (low) to test groups that may be optionally run if time is available, but are not required.

3. Test case processing order. Test process 10 may associate and assign a test case processing order to each test case included within the at least one test group. The order in which the at least one test case included within the at least one test group may be executed may include, but are limited to:

S [Sequentially]: test process 10 may select each test case within a particular test group in a sequential order for execution.

R [Random]: test process 10 may select each test case within a particular test group in random order for execution.

H [History]: test process 10 may select each test case within a particular test group based upon historical results, such as test cases that have failed more frequently in the past may be selected first.

T [Time]: test process 10 may select each test case within a particular test group based upon an estimated execution time. For example, test cases with the shortest execution time may be selected first and test cases with the longest execution time may be selected last. This may require that the selected test case has been previously executed.

4. Test case fail action. Test process 10 may associate and assign a test case fail action to a test case which may have failed within the test group. Actions to be taken if a test case in the test group fails include but are not limited to:

S [Stop]: if a test case fails, test process 10 may mark the test group as "F" (failed) and no other test cases included within the test group may be processed.

C [Continue]: if a test case fails, test process 10 may mark the test group as "F" (failed), but the remaining test cases included within the test group may continue to be processed.

5. Test group average run time. The average run time of a particular test group within the test pool.

The test pool (testPool 400) may be similar to an application in an object oriented structure. The test pool may include all of the test groups and test cases to be executed. The test pool properties may specify a selection order of the at least one test group and may include global properties that apply to each test group within the test pool, which may include, but are not limited to:

1. Test group selection order. Test process 10 may select each of the at least one test groups within a test group priority level based upon, at least in part, a test group selection order. Test group selection orders may include but are not limited to:

S [Sequentially]: test process 10 may select each test group within the test pool in a sequential order for execution.

R [Random]: test process 10 may select each test group within the test pool in a random order for execution.

H [History]: test process 10 may select each test group within the test pool based upon historical results, such as test groups that have failed more frequently in the past may be selected first.

T [Time]: test process 10 may select each test group within the test pool based upon an estimated execution time. For example, test groups with the shortest execution time may be selected first and test groups with the longest execution time may be selected last. This may require that the selected test group has been previously executed.

2. Test case fail action. Test process 10 may associate and assign a test case fail action to each test case at the test pool level. The test case fail action may be overridden at the test group level.

3. Test case processing order. Test process 10 may define a processing order for each test case at the test pool level. The test case processing order may be overridden at the test group level.

4. Test pool thresholds. The test pool may include a test pool threshold value, which, when reached, may stop test process 10. Test pool thresholds may include, but are not limited to:

X number of test cases failed.

Y percent of test cases failed.

Z number of test cases failed consecutively.

FIG. 6 provides an illustrative example of a summary of the test group and test case priority and status values that may be implemented in connection with software application testing.

Test process 10 may execute 100 at least one test group during testing of a software application in a multi-platform testing environment. Executing 100 the at least one test group during testing of the software application in the multi-platform testing environment may include concurrently executing 106 the at least one test group during testing of the software application across a plurality of operating systems. As described above, the at least one test group may be executed 100 based upon, at least in part, a priority level. Test process 10 may select the at least one test group to execute based upon, at least in part, the priority level. As discussed above, a test group priority of "H" (high) may be selected and executed 100 first, followed by test groups with a priority of "M" (medium"), followed by test groups with a priority of "L" (low). While three levels of priority are described, test group priority levels may include any number of priorities, such as 1 through 10. Within each priority level, test groups may also be selected and executed 100 based upon, at least in part, a test group selection order. Further, test groups may be selected and executed 100 based upon, at least in part, a test group status and a test group priority. For example, test groups may be selected based upon the following order:

1. Test groups with a status of "R" (rerun).

2. Test groups with a status of "X" (not run) and a priority of "H" (high).

3. Test groups with a status of "X" (not run) and a priority of "M" (medium).

4. Test groups with a status of "X" (not run) and a priority of "L" (low).

If there are no test groups with a status of "R" (rerun) or "X" (not run), but there are still outstanding test groups with a status of "F" (failed), then the test pool may be polled until a test group status changes. If there are no test groups remaining to be tested, then test process 10 may discontinue test process.

In an embodiment, test process 10 may test 108 incremental code during testing of the software application such that test process 10 may test new code for the software application as the new code is developed. The new code may include new, enhanced, or modified functionality, and/or code fixes. The new code may be installed on the appropriate testing platform. New test cases may be developed and included within an existing test group. Additionally, a new test group may be developed as a result of new functionality added to the software application from the new code. The new test group may include one or more new test cases, one or more old test cases, or some combination of both. Test process 10 may automatically place the test groups and/or test cases associated with the newly added code in the test repository. Test process 10 may suspend automated testing of the testing application as the new code is copied from the development and build system 312 to the test repository (testRepository 306). Any new test groups may be extracted from the test repository and added to the appropriate test pool associated with the corresponding test platform. Each test group that does not have a "F" (failed) status may be changed to "X" (not run) with a priority of "M" (medium). Any new test groups may be set to a status of "X" (not run) and a "High" execution priority. Old test groups that include new code may be set to a status of "X" (not run) and a priority of "H" (high). Test process 10 may resume automated testing of the software application once the new code has been copied from the development and build system 312 to the test repository (testRepository 306) and any new test groups have been extracted from the test repository and added to the appropriate test pool associated with the corresponding test platform.

As discussed above, the at least one test group may include at least one test case. Test process 10 may execute 110 the at least one test case during testing of the software application in the multi-platform testing environment. As discussed above, the at least one test case may be executed 110 based upon, at least in part, a test case processing order. For each test case that has been executed within the test group, test process 10 may produce a test case log. Test case logs may be automatically loaded to a centralized test case log repository (not shown). The centralized test case log repository may be in the form of a searchable archive. In an embodiment, the automatic load process may involve extraction of index data from the test case log. The index data, along with the full log, may be placed in a database that can be queried. The database may be queried to view how many tests were executed, when they were executed and the results of the execution. In another embodiment, the test case log data may be placed in a full text index database. Any form of a searchable data store may be used. Various types of management reports may be generated either by the system directly or through the use of programs, such as query code, that may read and extract data.

If the test case is executed successfully, test process 10 may run a test case support program (not shown). The test case support program may perform general cleanup activities, such as cleaning up temporary storage. After the test case support program finishes, another test case may be selected and executed from the test group.

In an embodiment, test process 10 may detect 102 an error in the software application based upon, at least in part, execution of the at least one test group. Test process 10 may further resolve 104 the error during execution of the at least one test group in the multi-platform testing environment. If a test case fails, test process 10 may trigger a test case analysis program (not shown). The test case analysis program may attempt to diagnose and correct the cause of the failure. For example, if disk space is exhausted, the test case analysis program may attempt to free or add more disk space. Once the corrective action has occurred, the test case may be automatically re-run. If after re-running the test case, the test case continues to fail, the test case and the test group may be marked as "F" (failed). Test process 10 may generate a notification of the failure and diagnostic information via electronic communication, such as an email notification, an instant message notification, a notification produced on a website, etc. The test case log also may be examined to determine the cause of failure.

If the test case failure is resolved, the failed test case may be returned to the test group for re-testing. The test case status may be changed from "F" (failed) to "R" (rerun), and the test case priority may be set to "H" (high), such that the test case may be executed first.

If the cause of the failure is determined to be a code failure, the test case log may be sent to development team 314. The code may be updated and re-entered into the test system. The relationship between the test case and the updated code may be recorded for future test group selection. The test case status may be changed from "F" (failed) to "R" (rerun) with a priority of "H" (high), such that the test case may be re-run first.

FIG. 7 shows the test selection order based upon the priority and status values. Test groups and/or test cases with a status of "I" (in progress), "P" (passed), or "F" (failed) may not be selected for execution.

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, test process 10 may be substituted for computing device 12 within FIG. 8, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a non-transitory computer readable medium having a plurality of instructions stored thereon, which, when executed by a processor, cause the processor to perform operations including:

extracting at least one test pool from a test repository, wherein each test pool of the at least one test pool is associated with a platform of a multi-platform testing environment and each test pool of the at least one test pool includes at least one test group, wherein the at least one test group includes at least one test case;

executing at least one test group of the at least one test pool during testing of a software application in the multi-platform testing environment, wherein the at least one test group is executed based upon, at least in part, a priority level and a test group status, the test group status identifying one of: each test case in the test group has not been run, each test case within the test group is being executed, each test case within the test group has been run and passed, and at least one test case within the test group includes a resolved failure;

testing incremental code of the software application including suspending execution of the at least one test group, extracting, from the test repository, one or more new test cases associated with the incremental code, adding the one or more new test cases to the at least one test pool, and resuming execution of the at least one test group;

detecting an error in the software application based upon, at least in part, execution of the at least one test group;

diagnosing the error during execution of the at least one test group to determine a specific cause of a failure of at least one test case of the at least one test group;

resolving the error during execution of the at least one test group in the multiplatform testing environment, including resolving the specific cause of the failure; and re-inserting the at least one test group into the test pool during execution of the at least one test group and changing the status and the priority level of the at least one test group in the test pool based upon, at least in part, resolving the error during execution, wherein the priority level of the at least one test group with the resolved error is set to a higher priority level.

2. The computer program product of claim 1, wherein executing the at least one test group during testing of the software application in the multi-platform testing environment includes concurrently executing the at least one test group during testing of the software application across a plurality of operating systems.

3. The computer program product of claim 1, further including:
executing the at least one test case during testing of the software application in the multi-platform testing environment.

4. The computer program product of claim 3, wherein the at least one test case is executed based upon, at least in part, a processing order.

5. The computer program product of claim 1, wherein resolving the error during execution of the at least one test group in the multiplatform testing environment further includes automatically re-running the at least one test case.

6. A system comprising:
at least one processor device and at least one memory architecture coupled with the at least one processor device, the at least one processor device configured for:
extracting at least one test pool from a test repository, wherein each test pool of the at least one test pool is associated with a platform of a multi-platform testing environment and each test pool of the at least one test pool includes at least one test group, wherein the at least one test group includes at least one test case;
executing at least one test group of the at least one test pool during testing of a software application in the multi-platform testing environment, wherein the at least one test group is executed based upon, at least in part, a priority level and a test group status, the test group status identifying one of: each test case in the test group has not been run, each test case within the test group is being executed, each test case within the test group has been run and passed, and at least one test case within the test group includes a resolved failure;

testing incremental code of the software application including suspending execution of the at least one test group, extracting, from the test repository, one or more new test cases associated with the incremental code, adding the one or more new test cases to the at least one test pool, and resuming execution of the at least one test group;

detecting an error in the software application based upon, at least in part, execution of the at least one test group;

diagnosing the error during execution of the at least one test group;

resolving the error during execution of the at least one test group in the multiplatform testing environment; and re-inserting the at least one test group into the test pool during execution of the at least one test group and changing the status and the priority level of the at least one test group in the test pool based upon, at least in part, resolving the error during execution, wherein the priority level of the at least one test group with the resolved error is set to a higher priority level.

7. The system of claim 6, wherein executing the at least one test group during testing of the software application in the multi-platform testing environment includes concurrently executing the at least one test group during testing of the software application across a plurality of operating systems.

8. The system of claim 6, further including:
executing the at least one test case during testing of the software application in the multi-platform testing environment.

9. The system of claim 6, wherein resolving the error during execution of the at least one test group in the multiplatform testing environment further includes automatically re-running the at least one test case.

* * * * *